United States Patent

Katto et al.

[15] 3,668,095

[45] June 6, 1972

[54] METHOD OF MANUFACTURING A METALLIC OXIDE FILM ON A SUBSTRATE

[72] Inventors: Hisao Katto; Kazunari Kobayashi, both of Hachioji; Yasushi Koga, Mitaka; Machiko Koyama, Tokorozawa, all of Japan

[73] Assignee: Hitachi, Ltd., Tokyo, Japan

[22] Filed: Mar. 26, 1970

[21] Appl. No.: 22,908

[30] Foreign Application Priority Data

Mar. 31, 1969 Japan....................................44/23791
Feb. 16, 1970 Japan....................................45/12660

[52] U.S. Cl...............................................204/164, 204/312
[51] Int. Cl...................B01k 1/00, B32b 15/04, B32f 17/00, B32b 15/04, B22b 17/00
[58] Field of Search ........................................204/164, 38 A

[56] References Cited

UNITED STATES PATENTS

| | | | |
|---|---|---|---|
| 3,258,413 | 6/1966 | Pendergast | 204/38 A |
| 3,473,959 | 10/1969 | Ehinger et al | 204/164 |
| 3,481,703 | 12/1969 | Zirngibl et al | 204/164 X |
| 3,536,547 | 10/1970 | Schmidt | 204/164 X |

*Primary Examiner*—F. C. Edmundson
*Attorney*—Craig, Antonelli and Hill

[57] ABSTRACT

A method for manufacturing a thin, highly pure metallic oxide film by the use of glow discharge on a substrate including the steps of preparing a mixture gas of oxygen and a metallic halide with controlled pressure in an evacuated chamber into which a substrate is placed, applying a high alternating electrical field of a frequency higher than 1 KHz to the chamber to produce the glow discharge adjacent to the substrate, thereby causing the required chemical reaction for the formation of the metallic oxide.

15 Claims, 7 Drawing Figures

INVENTORS
HISAO KATTO, KAZUNARI KOBAYASHI
YASUSHI KOGA and MACHIKO KOYAMA

BY Craig, Antonelli, Stewart & Hill
ATTORNEYS

INVENTORS
HISAO KATTO, KAZUNARI KOBAYASHI,
YASUSHI KOGA and MACHIKO KOYAMA

BY Craig, Antonelli, Stewart & Hill
ATTORNEYS

INVENTORS
HISAO KATTO, KAZUNARI KOBAYASHI
YASUSHI KOGA and MACHIKO KOYAMA
BY Craig, Antonelli, Stewart & Hill
ATTORNEYS INVENTORS
HISAO KATTO, KAZUNARI KOBAYASHI,
YASUSHI KOGA and MACHIKO KOYAMA
BY Craig, Antonelli, Stewart & Hill
ATTORNEYS INVENTORS
HISAO KATTO, KAZUNARI KOBAYASHI,
YASUSHI KOGA and MACHIKO KOYAMA
BY Craig, Antonelli, Stewart & Hill
ATTORNEYS

METHOD OF MANUFACTURING A METALLIC OXIDE FILM ON A SUBSTRATE

FIELD OF THE INVENTION

This invention relates to a method for depositing a metallic oxide film on a substrate by glow discharge.

DESCRIPTION OF THE PRIOR ART

The metallic oxide film is used as a passivating film (mainly electrically) or a dielectric film (isolation film) for semiconductor elements or as a dielectric film for condensers. Usually such metallic oxide film by the glow discharge comprises effecting a glow discharge in an atmosphere of a mixture of metal-organic compound vapor or metal halide vapor and nitric oxide ($N_2O$), nitrogen dioxide ($NO_2$) or water vapor ($H_2O$) and thereby forming an oxide film of the metal on the surface of a desired substrate.

A feature of the method for preparing a metallic oxide film by the glow discharge is that the oxide film can be formed at a low temperature, but the characteristics of the thus obtained film, that is, passivation characteristics of a semiconductor element, are not sufficient. Thus, an improvement of the passivation characteristics has been heretofore carried out by annealing the film at about 500° to 600° C. after the formation of the film, but a satisfactory result as a protection film for a circuit element has not been obtained as yet. Furthermore, the annealing at an elevated temperature brings about a phenomenon of crystallizing the metallic oxide film and at the same time causes to develop pinholes in the film, resulting in a considerable decrease in the dielectric characteristic of the film.

SUMMARY OF THE INVENTION

An object of the present invention is to provide a novel method for preparing a metallic oxide film by glow discharge.

Other object of the present invention is to provide a novel method for preparing a metallic oxide film excellent in passivation characteristics of a semiconductor element.

Another object of the present invention is to provide a method for preparing a metallic oxide film excellent in dielectric characteristics.

The gist of the present invention for attaining these objects of the present invention resides in a method for depositing a metallic oxide film on a substrate by placing the substrate in an atmosphere of a mixture of a specific metal halide having a controlled vapor pressure, that is, a metal halide vapor and oxygen or oxygen and nitrogen, and effecting a glow discharge at a place near the substrate.

In the present invention, it is proposed to heat-treat the thus obtained metallic oxide film at a temperature lower than the crystalizing temperature of the metallic oxide to stabilize the electrical characteristics of the metallic oxide film.

Furthermore, in the present invention, it is proposed to heat the substrate to a temperature of more than 500° C., but less than the melting point of the substrate when the specific metallic oxide is deposited on the substrate by the glow discharge.

Still furthermore, in the present invention, it is proposed to select an oxygen vapor pressure range of 0.7 to 5 Torr and an aluminum chloride vapor pressure range of 0.05 to 2 Torr when the metallic oxide film, particularly $Al_2O_3$ film, is formed by the glow discharge.

Heretofore, no research as regards of the formation of a metallic oxide film by glow discharge has been carried out, because the reaction could not be readily carried out and the film deposition rate was very low, even if the metallic halide vapor was mixed with oxygen and heated to a high temperature.

The present inventors have experimentally found and confirmed that, when the glow discharge is effected in an atmosphere of a mixture of metallic halide vapor and oxygen, the film deposition rate is relatively high and the thus obtained film can have an excellent passivation characteristic.

The mechanism of metallic oxide deposition by the glow discharge has not been clarified as yet, but it is presumed that a metallic halide is electrolytically dissociated into metal and halogen and the metal is combined with oxygen activated by the glow discharge to form a metallic oxide.

The present method for depositing a metallic oxide film is based on a mechanism of building up metallic oxide molecules on the surface of a substrate, and thus the restrictions to the kind of a substrate are only two conditions as follows:

1. The melting point of a substrate must be higher than the heating temperature of the substrate, and
2. A substrate which will bring about an unfavorable effect due to the reaction between the deposited metallic oxide and the substrate should not be used.

Thus, any substrate can be employed, so long as it can satisfy these two conditions.

Usually, the metallic oxide formed according to the present invention builds up on a surface of a substrate of such semiconductor materials as Si, Ge, GaAs, InP, InSb, CdS, $GaAs_{1-x}Px$, InSb, etc., or a surface of a substrate of such metals as Al, Cu, Fe, Ta, etc., or a surface of a substrate of such insulating materials as ceramics, glass, etc., or a glass layer such as $SiO_2$, $Si_3N_4$, etc. provided on the surface of semiconductor substrate, or a glass layer of oxide mixture of phosphorous glass, etc., or a metal layer of an insulator substrate.

In order to effect passivation of a semiconductor element according to the present invention, a selective diffusion technique (planer technique) which is to apply an $SiO_2$ mask to a surface of semiconductor substrate is used to selectively add a desired impurity to the substrate, and a desired circuit element, for example, a transistor, diode, diffusion resistance, etc. is thereby formed. Then, a metallic oxide film is deposited onto the $SiO_2$ film or onto the surface of the semiconductor substrate after a part or all of the $SiO_2$ film has been removed therefrom, or onto a new, well-known film, for example, the $SiO_2$ film, etc., which is deposited after the previous $SiO_2$ film has been completely removed therefrom.

An example of forming a dielectric film of a condenser according to the present invention is given below:

After a metal layer of one kind of metal has been deposited on an insulator substrate a (thin film circuit substrate), a metallic oxide film is made to build up to a desired thickness on the substrate surface, particularly the metal layer by effecting a glow discharge in the atmosphere of a mixture of metal halide vapor and oxygen. If necessary, the substrate is heated to a temperature of higher than 500° C. during the deposition of the metallic oxide film or sufficiently heat-treated at a temperature higher than 500° C. after the metallic oxide film has been deposited. Then, another metal layer is deposited, such as an electrode, on the metallic oxide layer deposited on the former metal layer. A film condenser is thus formed by the lower metal layer, the upper metal layer and the oxide layer disposed between these two metal layers.

The metallic oxide layer deposited according to the present invention consists of SiO, $SiO_2$, $Al_2O_3$, $TiO_3$, $ZrO_2$, $Cr_2O_3$, MgO, $Cr_2O_3$, BeO, etc. Particularly the SiO, $SiO_2$ or $Al_2O_3$ film is utilized as the passivating film for the semiconductor element.

In depositing such oxide film, halides of the metals contained in the compositions of the oxide film are utilized. For example, $SiCl_4$ is utilized in the case of SiO and $SiO_2$. In the case of $Al_2O_3$, $AlCl_3$ or $AlBr_3$ is utilized. In the case of $TiO_3$, $TiCl_4$, etc. are utilized.

During the building-up of the metallic oxide film according to the present invention, the build-up and the annealing of the metallic oxide film can be effected at the same time by heating the substrate at a temperature, higher than 500° C. Particularly in that case, an evolution of volatile impurities or gas from the built-up film or an increase in pinholes in the film is not brought about even by heating the substrate at a temperature higher than 800°C.

Heretofore, a suitable method for depositing an alumina layer at 500° to 800° C. has not been available. On the other hand, a stable alumina film can be stably deposited on the surface of the substrate at a relatively low temperature according to the present invention.

In the present invention, damages such as lattice defects, etc. are brought about at the surface of a substrate by a glow discharge, and as a result, the electron mobility at the surface of the substrate is lowered. However, such damages can be prevented by heat-treating the deposited metallic oxide film at a temperature higher than the temperature of depositing the metallic oxide film, or depositing such a protective film as an $SiO_2$ film, etc. on the surface of the substrate before the desired metallic oxide film is deposited on the surface of the substrate.

The present invention consists of the essentials as explained above, and the following effects can be attained in the present invention:

The first effect is a stabilization of characteristics of the surface of the semiconductor element against B-T treatment. Usually, a treatment called "B-T treatment" is carried out to investigate the surface passivity of a semiconductor element. The B-T treatment (bias-temperature treatment) is to determine a change of a surface charge density induced on the surface of a semiconductor by applying an electric potential between a metal electrode of a semiconductor element having a MOS structure and the semiconductor and heating the semiconductor to a suitable temperature (150° – 300° C.). Those having smaller changes in the surface charge density of the elements as a result of such B-T treatment are deemed to be films having more suitable passivity or passivation characteristics.

The metallic oxide film deposited on the surface of a semiconductor according to the present invention has less change in surface charge density owing to the B-T treatment and shows an excellent passivation characteristic, as will be shown in some examples.

The second effect of the present invention is that a good adhesiveness can be obtained between the substrate and the deposited metallic oxide film by heating the substrate at least to about 100° C. to about 500° C. when the metallic oxide film is to be deposited on the substrate by a glow discharge. That is, a metallic oxide film can be deposited on a substrate at a low temperature below 500° C. This feature makes it possible to deposit the metallic oxide film even on a semiconductor element having a high sublimating ability, such as ZnSe, Se, GaAs, Cds, etc. without changing its electrical and physical characteristics. Furthermore, it is possible to deposit the metallic oxide film on a semiconductor substrate provided with a vapor-deposited wiring layer of Al or the like, for example, IC, LSI, etc.

The third effect of the present invention is that it is possible to reduce the contamination in the deposited metallic oxide film to almost zero, because a high purity oxygen is used as an oxidant. Various characteristics of the metallic oxide film as a dielectric film can be considerably improved, as compared with those obtained according to the conventional methods.

The fourth effect of the present invention is that the dielectric characteristics of the deposited film, that is, the film obtained by heating the substrate during the glow discharge is excellent. When the oxide film, after the deposition at a substrate temperature of 200° to 300° C., is heat-treated at 600° to 700° C. for passivation, water, nitrogen, oxygen or other atmosphere gases, and organic impurities are evaporated from the film during the heat treatment, and often pinholes are brought about in the oxide film. The dielectric characteristics of the metallic oxide film are significantly deteriorated by the presence of pinholes. Particularly, when the heat-treating temperature exceeds 800° C., the metallic oxide film is liable to undergo crystallization and the dielectric property is deteriorated. However, when the substrate is heated to a temperature of 500° C. or higher during the metallic oxide deposition, water, gas or other impurities become fewer in the deposited metallic oxide film, and thus a compact film free of pinholes can be obtained. The dielectric property of such compact metallic oxide film is excellent. Particularly, the metallic oxide film deposited at a substrate temperature of 800° C. or higher contains almost no water, gas or other impurities at all. Furthermore, the metallic oxide film can have a very stable dielectric property even by the heat treatment at a high temperature.

For example, it is observed in the metallic oxide film deposited at a low temperature that a reduction in film thickness and an increase in pinhole diameter are brought about by a glow discharge treatment at 800° C. or heat treatment in a hydrogen atmosphere at 1,000° C., but none of such inconveniences is seen in the metallic oxide film deposited during the heating of the substrate at a temperature higher than 800° C., even by applying such treatments.

The fifth effect of the present invention is that the film obtained according to the present invention, that is, the film obtained by heating the substrate at a temperature of 500° C. or higher during the glow discharge, can have a reproducible etching speed. This effect means that the film has a good workability.

The metallic oxide film deposited by a glow discharge at a low temperature has a relatively poor compactness and has a fast, but not a constant etching speed, whereas the metallic oxide film deposited while heating the substrate at a temperature of 500° C. or higher has a high compactness and can have a constant etching speed almost dependent upon the film-depositing conditions.

The sixth effect of the present invention can be obtained when a metallic oxide film is deposited, as a protective film for the semiconductor, on the surface of the semiconductor element. That is, when a metallic oxide film is deposited, as a protective film, on the surface of a semiconductor element (for example, a diode element, a transistor element, etc.) by a glow discharge at a low temperature according to the conventional, well-known method, and heat-treated for passivation of the surface, the electrical characteristics, particularly incipient characteristics of the element before the deposition of the film, are changed. Such tendency is a disadvantage also common to the well-known protective films for the semiconductors.

However, in the metallic oxide film deposited on the surface of a semiconductor element according to the present invention, the incipient characteristics of the semiconductor element are not changed at all or are hardly changed at all.

The seventh effect of the present invention is that the metallic oxide film deposited according to the present invention has a small surface adsorption of water, etc. Particularly, the alumina film deposited at a substrate temperature of 800° C. or higher has a remarkably small surface adsorption.

Further, the eighth effect of the present invention is that the process can be shortened by carrying out the film deposition and the heat treatment at the same time.

The ninth effect of the present invention is that the build-up speed of the metallic oxide film is higher in the present invention than in the conventional methods.

These effects clearly indicate that the present method is suitable for the mass production.

DESCRIPTION OF THE PREFERRED EMBODIMENTS

Figure 1:
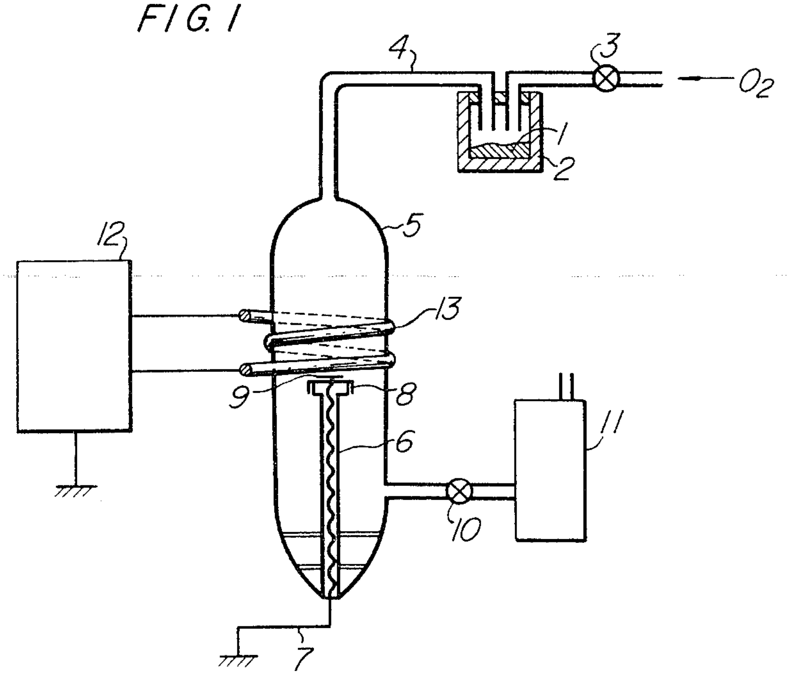
FIG. 1 is a schematic, cross-sectional elevation view of a vertical glow discharge oven for carrying out the present invention.

The present invention will be hereinafter explained, referring to the drawings and examples:

EXAMPLE 1

An apparatus shown in FIG. 1 was employed in EXAMPLE 1. In FIG. 1, the apparatus consists of a unit for supplying a gas mixture, which comprises a vaporizer 2 for source metal halide 1, a needle valve 3 for controlling oxygen gas and connecting pipes 4 to connect the needle valve 3 with the vaporizer 2 and the vaporizer 2 to a reactor, of the reactor for carrying out decomposition reaction of the gas mixture on a substrate, and of a gas exhauster.

The reactor for carrying out the present invention comprises a vertical, quartz reactor tube 5 provided with an inlet for supplying a gas mixture consisting of metal halide vapors and oxygen and an outlet for discharging reacted gases. An insulating support 6 is provided at the center of the reactor tube 5. A platinum plate electrode 8 is provided at the top of the support 6, grounded through a terminal lead wire 7, and is in a structure capable of placing a substrate 9 on the platinum plate electrode. An oscillator (bombarder) 12 for effecting the reaction is provided with a discharge terminal wound around the reaction tube 5. Further, numeral 10 is a valve for controlling the exhaust gas into the exhauster system, and numeral 11 is an exhauster pump.

The present example was carried out by means of this apparatus according to the following operational procedure. Individual numerical values are considerably different, depending upon the kind of metal halides, and thus are shown in summary in TABLE 1.

1. Take a suitable amount of metal halide (MXn) and insert it in a vaporizer 2.
2. Place a substrate 9 on a platinum plate electrode 8; close a needle valve 3; open a valve 10 for controlling an exhaust gas; continue exhausting down to 0.01 mmHg.
3. After the pressure reduction to a predetermined one, open the needle valve 3 slowly to make a desired pressure of the gas mixture.
4. After the output voltage of the oscillator is set to a predetermined value, for example, a value in a range of from 1 KV to 10 KV to produce the predetermined frequency, effect a glow discharge between the discharge terminal 13 and the platinum plate electrode 8 to carry out the reaction on the substrate. A dielectric film of the pure metallic oxide can be thereby deposited.

Dielectric films of metallic oxides were deposited on substrates from various metal halides according to the foregoing procedure. The result is given in TABLE 1.

The optimum conditions depend upon the kinds of metal halides, but the conditions common to all the examples of the present invention can be summarized as follows:

1. It is necessary that the frequency be 1,000 Hertz (Hz) or more. If the frequency is less than 1,000 Hertz (Hz), it is very difficult to deposit an oxide film having a thickness of 1,000 A or more.
2. It is necessary that the output voltage of the oscillator be more than a certain value determined by the apparatus. If the output voltage is lower than said value, the discharge cannot be extended over the entire surface of the substrate. Thus, a uniformly built-up film cannot be obtained.
3. The growth speed of the oxide dielectric film is increased in a relation proportional to an increase in the output voltage, but becomes constant above a certain value determined by the apparatus.

Figure 2:
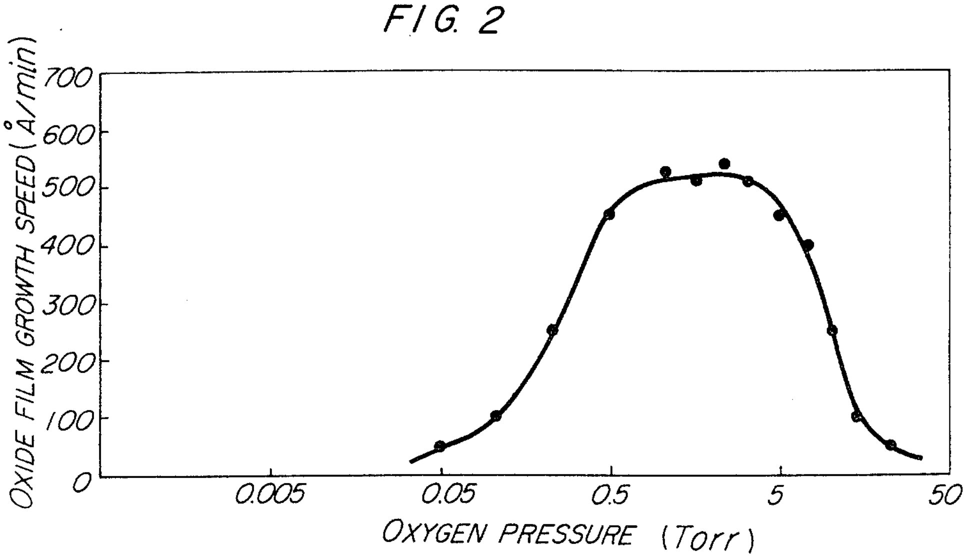
FIG. 2 is a diagram showing the relation between the oxygen pressure and the growth speed of a dielectric film of metallic oxide.

In FIG. 2, a relation between the oxygen pressure in the reactor tube and the build-up speed of the $Al_2O_3$ film is shown when an $Al_2O_3$ film is deposited on a substrate according to Examples of the present invention. As is clear from FIG. 2, the maximum growth speed can be obtained at an oxygen pressure of 0.5–5 Torr.

As regards metal halides other than $AlCl_3$, the maximum speed of the oxide film can be obtained at an oxygen pressure of 0.1 to 1 Torr for $SiBr_4$ and $SiCl_4$. For almost all the metal halides shown in TABLE 1, the maximum growth speed can be obtained at an oxygen pressure of 0.5 to 5 Torr in the same manner as for $Al_2O_3$.

In order to investigate the surface passivity of the $Al_2O_3$ film deposited according to the method, a surface charge density ($N_{FB}$) provoked on the surface of a silicon substrate by such film was measured and found to be $11^{11}$ $cm^{-2}$. If the $Al_2O_3$ film is deposited according to the conventional, well-known method, for example, by a method for thermally decomposing an organoaluminum, the surface charge density was $10^{12}$ $cm^{-2}$. Thus, the surface charge density was decreased by one-tenth decreased.

Then, in order to make the deposited oxide film possess an excellent passivation characteristic, a heat treatment was carried out.

The optimum heat-treating temperature was determined by changing a temperature within a range of 100° to 1,000° C. in an atmosphere of oxygen gas, nitrogen gas, argon gas or hydrogen gas. In any atmosphere, the passivation effect appeared at a temperature of from 600° C. upwards, and became remarkable around about 700° C. In the case of alumina, the crystallization of alumina took place at about 800° C., and the dielectric property was somewhat deteriorated.

Even in the cases of $SiO_2$, $TiO_2$ and $ZrO_2$ other than alumina, the passivation took place at a temperature from 600° C. upwards in the same manner as for alumina, and could be attained by heat treatment below their crystallization temperature (the crystallization temperature of $SiO_2$ was about 1,500° C., and those of $TiO_2$ and $ZrO_2$ where about 800° C., which was almost equal to that of alumina).

TABLE 1

| Run No. | Metal halide | Substrate temperature (° C.) | Oxygen pressure (torr) | Vaporizer temperature (° C.) | Oscillator frequency | Growth speed of oxide film (A./min.) | Oscillator output voltage (kv.) |
|---|---|---|---|---|---|---|---|
| 1 | $AlCl_3$ | 400 | 0.01–0.05 | 110 | 400 kc. | 50 | 2 |
| | | | 0.05–0.5 | | | 100 | |
| | | | 0.5–5 | | | 500 | |
| | | | 15–20 | | | 100 | |
| 2 | $AlBr_3$ | 500 | 0.5–5 | 120 | 5 mc. | 800 | 3 |
| 3 | $SiBr_4$ | 200 | 0.1–1 | 0 | 10 mc. | 1,000 | 5 |
| 4 | $SiCl_4$ | 200 | 0.1–1 | 0 | 10 mc. | 1,100 | 6 |
| 5 | $TiCl_4$ | 200 | 0.5–5 | 0 | 400 kc. | 200 | 4.5 |
| 6 | $TiBr_4$ | 200 | 0.5–5 | 50 | 400 kc. | 200 | 6 |
| 7 | $TiF_4$ | 200 | 0.5–5 | 200 | 1 kc. | 40 | 2 |
| 8 | $TiI_4$ | 100 | 0.5–5 | 150 | 100 kc. | 100 | 7 |
| 9 | $ZrBr_4$ | 300 | 0.5–5 | 240 | 5 mc. | 500 | 5.5 |
| 10 | $ZrCl_4$ | 300 | 0.5–5 | 200 | 400 kc. | 300 | 4 |
| 11 | $ZrI_4$ | 200 | 0.5–5 | 200 | 1.0 mc. | 700 | 7.5 |

The heat-treating time was at least 30 minutes for any of the metallic oxide films. The changes in $N_{FB}$ values of the alumina film obtained according to the present invention and the alumina film obtained according to the conventional method were measured and compared when a constant voltage was applied at a heating temperature of 250° C. at an applied voltage ranging $-10^6$ to $10^6$ (V/cm) for 1 hour. $\Delta N_{FB}$ of the alumina film of the conventional method was $3 \times 10^{12}$, whereas that of the alumina of the present invention was $10^{12}$, which was one-third of the former.

EXAMPLE 2

An alumina film having a thickness of about 4,000 A was deposited on a silicon substrate heated to 300° C. by effecting a glow discharge in an atmosphere of oxygen and aluminum chloride (discharge condition: voltage 1 KV, alternating current, of 400 KHz), using a vertical, glow discharge reactor oven as used in EXAMPLE 1.

In order to investigate the relation between the dielectric characteristic of the thus obtained film and the atmosphere of the glow discharge, that is, the oxygen pressure within the oven or a vapor pressure of aluminum halide, an aluminum electrode was provided at the built-up alumina film by vapor deposition, and a voltage of 100 V was applied between the aluminum electrode and the silicon substrate. The leakage current of the alumina films deposited in the respective atmospheres was measured. The results are given in TABLE 2.

TABLE 2

| Oxygen pressure (Torr) | Aluminum chloride pressure (Torr) | Leak current ($A/mm^2$) |
|---|---|---|
| 2 | 0.03 | $10^{-3}$ |
| 2 | 0.05 | $10^{-11}$ |
| 2 | 0.1 | $10^{-12}$ |
| 2 | 0.3 | $10^{-12}$ |
| 2 | 1.0 | $10^{-12}$ |
| 2 | 2.0 | $10^{-11}$ |
| 2 | 3.0 | $10^{-3}$ |
| 0.5 | 0.3 | $10^{-4}$ |
| 0.7 | 0.3 | $10^{-10}$ |
| 1.0 | 0.3 | $10^{-12}$ |
| 3.0 | 0.3 | $10^{-12}$ |
| 5.0 | 0.3 | $10^{-11}$ |
| 7.0 | 0.3 | $10^{-6}$ |

As is clear from TABLE 2, an alumina film having a very high breakdown voltage was obtained by effecting a glow discharge at an oxygen vapor pressure of 0.7 to 5 Torr and at an aluminum chloride vapor pressure of 0.05 to 2 Torr, when alumina was to be prepared from aluminum chloride and oxygen by glow discharge.

The tendency shown in TABLE 2 is seen not only in the deposition of the $Al_2O_3$ film, but also in the deposition of other metallic oxide film.

EXAMPLE 3

Figure 3:
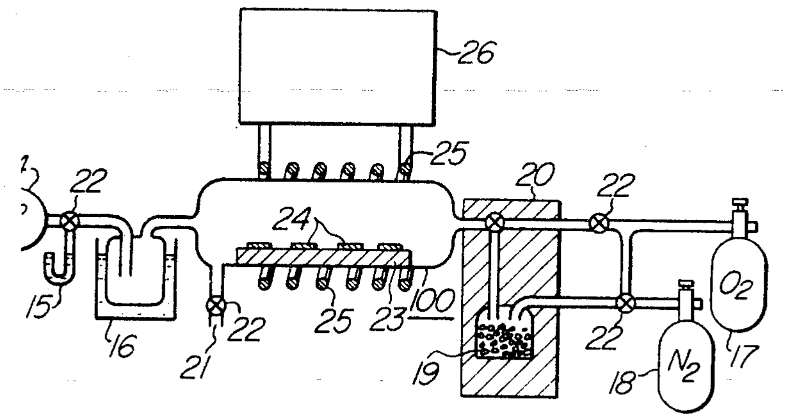
FIG. 3 is a schematic view of a horizontal, glow discharge reactor oven for carrying out the present invention.

A metallic oxide film was deposited while heating a substrate, using a horizontal, glow discharge apparatus as shown in FIG. 3, wherein the numerals have the following meanings:

100: A quartz reactor tube, into which samples are placed.
14: A vacuum pump, which is utilized to discharge or replace the gas within the reactor tube.
15: A manometer to measure the degree of vacuum in the reactor tube.
16: Liquid nitrogen, to prevent oil in the vacuum pump from diffusion.
17: An oxygen cylinder.
18: A nitrogen cylinder.
19: A vaporizer, into which a metal halide, for example, $AlCl_3$, is placed.
20: A heater to preheat a gas to be introduced into the reactor tube.
21: An exhaust outlet.
22: A valve for stopping the gas flow or controlling the flow rate.
23: A jig for supporting the specimen. SiC-coated graphite or silicon is used and heat is released by high frequency heating.
24: A substrate of silicon wafer.
25: A high frequency coil to produce a glow discharge in the reactor tube.
26: A converter for supplying an electric power to the high frequency coil.

The reactor apparatus shown in FIG. 3 is a horizontal reactor tube, but a vertical reactor tube can be utilized. Furthermore, an attempt to obtain a built-up film having a uniform film thickness on the sample can be made by rotating the jig for supporting the sample.

In these reactor apparatus, the glow discharge was effected at a vaporizer temperature of 95° C., a degree of vacuum in the reactor tube of 0.7 Torr, a silicon substrate temperature of 400° to 1,000° C. As a result, an alumina film could be deposited on a silicon substrate 24 from aluminum chloride. In that case, an alternating electrical field of a frequency of 400 kilocycles was applied to the high frequency coil 25 as the glow discharge conditions. The nitrogen flow rate through the vaporizer was 3 cc/min., and the oxygen flow rate was 2–5 cc/min (the degree of vacuum within the reactor tube was 0.7 Torr).

Figures 4, 5:
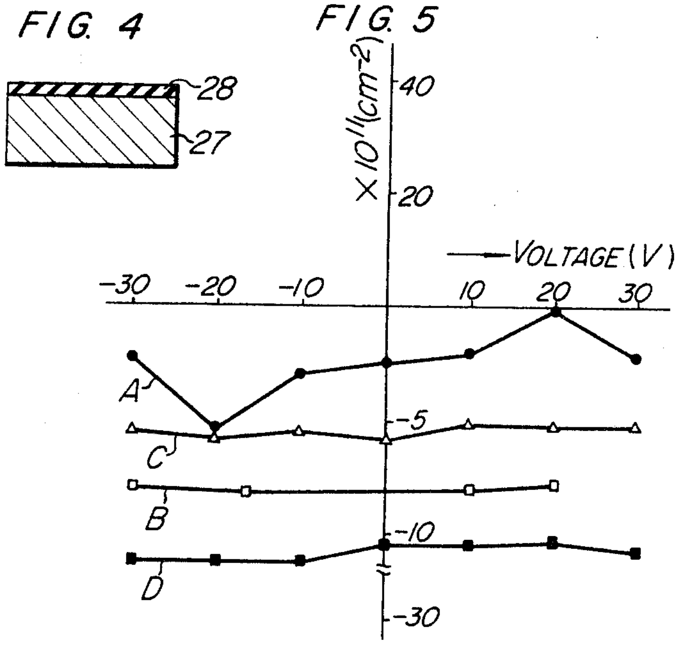
FIG. 4 is a cross-sectional elevation view of a semiconductor element having a metallic oxide on the surface.
FIG. 5 shows a change of $N_{FB}$ values by B-T treatment of the MOS element having an alumina film.

In FIG. 4, a cross-sectional elevation view of the sample prepared according to these conditions is given. Numeral 27 is a silicon substrate, and numeral 28 is an alumina film ($Al_2O_3$) deposited on the surface of the silicon substrate.

Al was vapor-deposited on the $Al_2O_3$ film 28 of the sample shown in FIG. 4, to form a MOS type element. In order to carry out the so-called B-T treatment, the element was heated to 250° C. and at the same time, a voltage of 1 to 30 V was applied between the aluminum vapor-deposited layer and the silicon substrate for one hour. Then, the surface charge densities $N_{FB}$ provoked on the surface of the silicon substrate immediately under the $Al_2O_3$ film corresponding to the respective conditions were determined. The result is shown in FIG. 5, wherein the ordinate represents $N_{FB}$ and the abscissa the applied voltages.

Curve A shows a sample at an $Al_2O_3$ film-depositing temperature of 500° C.; curve B a sample at 600° C.; curve C a sample at 700° C.; curve D at 800° C.

The curves B, C and D show that the surface charge densities were not changed almost at all by the B-T treatment and were stable, but the curve A shows that the surface charge density was changed. Such tendency is much more distinguished at a lower substrate temperature. The change of the surface change density is closely related to the instability of the surface of the semiconductor element.

Accordingly, in depositing a metallic oxide film while heating a substrate, a relatively stable film can be obtained by selecting a substrate temperature of 500° C. or higher.

Figure 6:
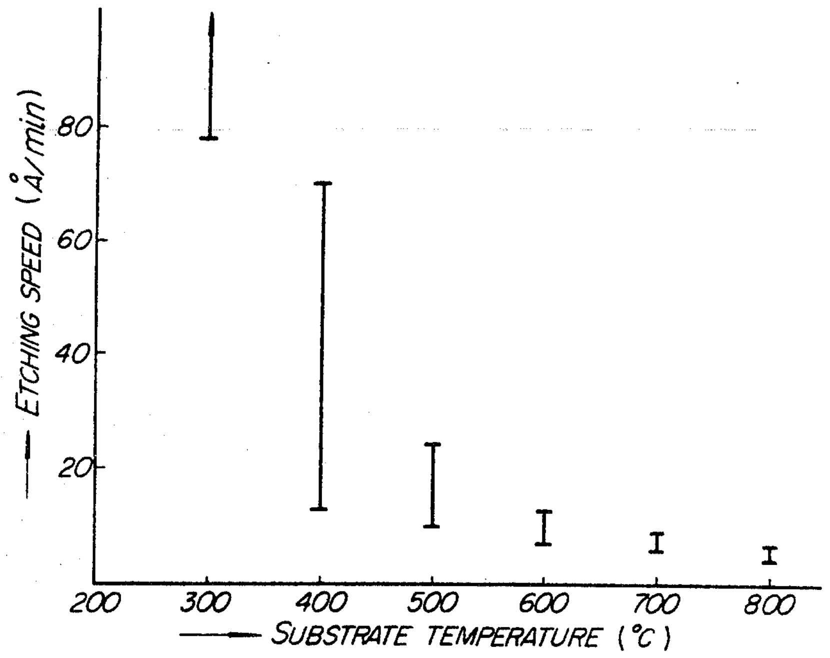
FIG. 6 shows relations between the etching speed of the alumina film and the substrate temperature for the film.

In FIG. 6, the result of etching speed of the deposited alumina film is shown when an alumina film was deposited on a substrate by a glow discharge by changing the substrate temperature at an interval of 100° C. according to the present invention. The abscissa represents a substrate temperature when the film was deposited, and the ordinate represents etching speed. Room temperature was used as the etching temperature and a solution consisting of an aqueous 50 percent (by weight) hydrofluoric acid solution, an aqueous 60 percent (by weight) nitric acid solution and water, which were mixed in proportions of 15 : 10 : 300, was used as an etching solution, which is known as P-etching solution in the field of producing semiconductor devices. It is seen from FIG. 6 that the etching speed of the alumina film fluctuated at the substrate temperature below 400° C., but the range of the fluctuation was small and the etching speed was low at a substrate temperature of 500° C. or higher. It is also seen from FIG. 6 that a compactness of the film is high at the substrate temperature of 500° C. or higher; the etching speed is almost constant, resulting in better workability; the relatively low etching speed facilitates precision working.

Figure 7:
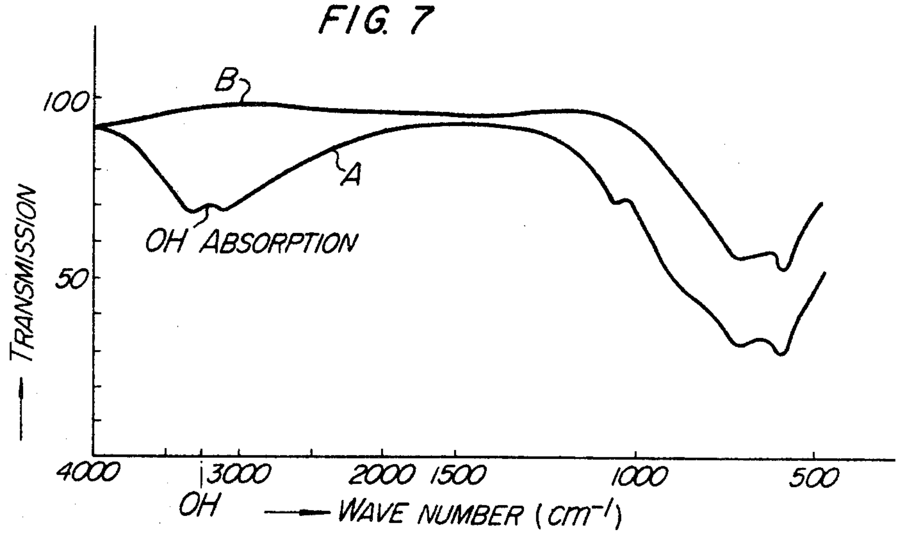
FIG. 7 shows infra-red spectral curves obtained when the alumina film is boiled.

In FIG. 7, infra-red absorption spectra are shown when the alumina film was boiled. A represents the infra-red absorption curve when the $Al_2O_3$ film deposited at a substrate temperature below 700° C. was boiled for 30 minutes, and B represents the infra-red absorption curve when the $Al_2O_3$ film deposited at a substrate temperature of 800° C. was boiled for 30 minutes.

The film deposited below 700° C. had a remarkable light absorption due to the OH radical, whereas the film deposited at 800° C. had no light absorption due to the OH radical almost at all. This means that the hygroscopicity of the film deposited at a substrate temperature of 800° C. is improved. Furthermore, the film whose substrate was heated below 700° C. showed a slight hygroscopicity owing to the boiling treatment. Thus, it is desirable to set a substrate temperature to 500° C. or more, particularly 800° C. or more, when an $Al_2O_3$ film is to be deposited while heating a substrate.

Figure 8:
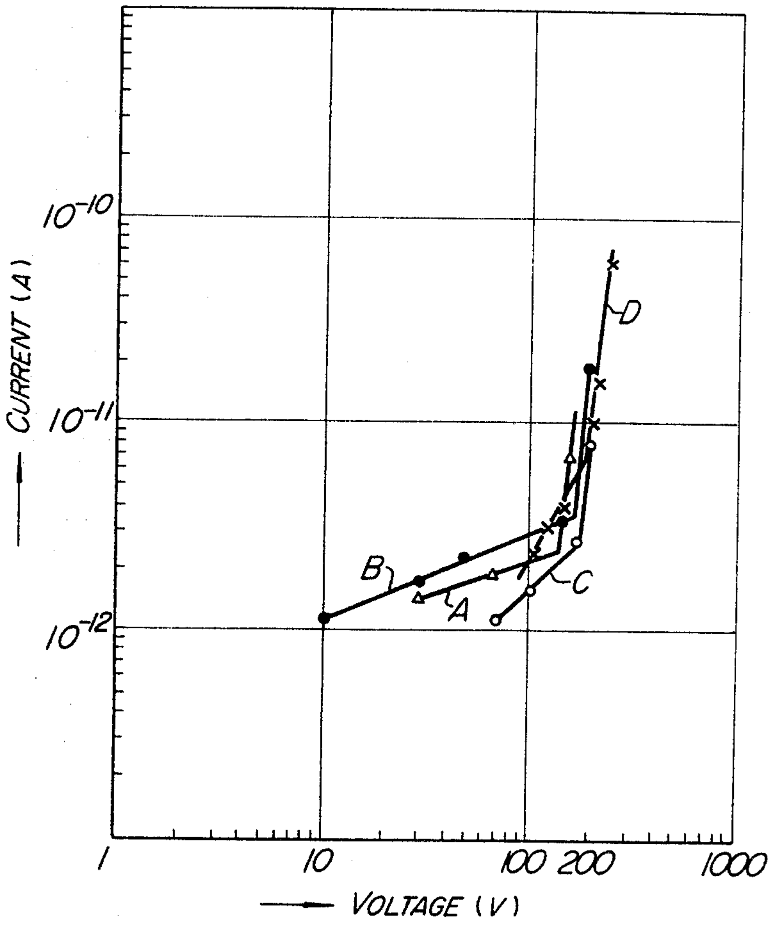
FIG. 8 shows dielectric characteristics when an alumina film is deposited at a high temperature and then heat-treated.
Figure 9:
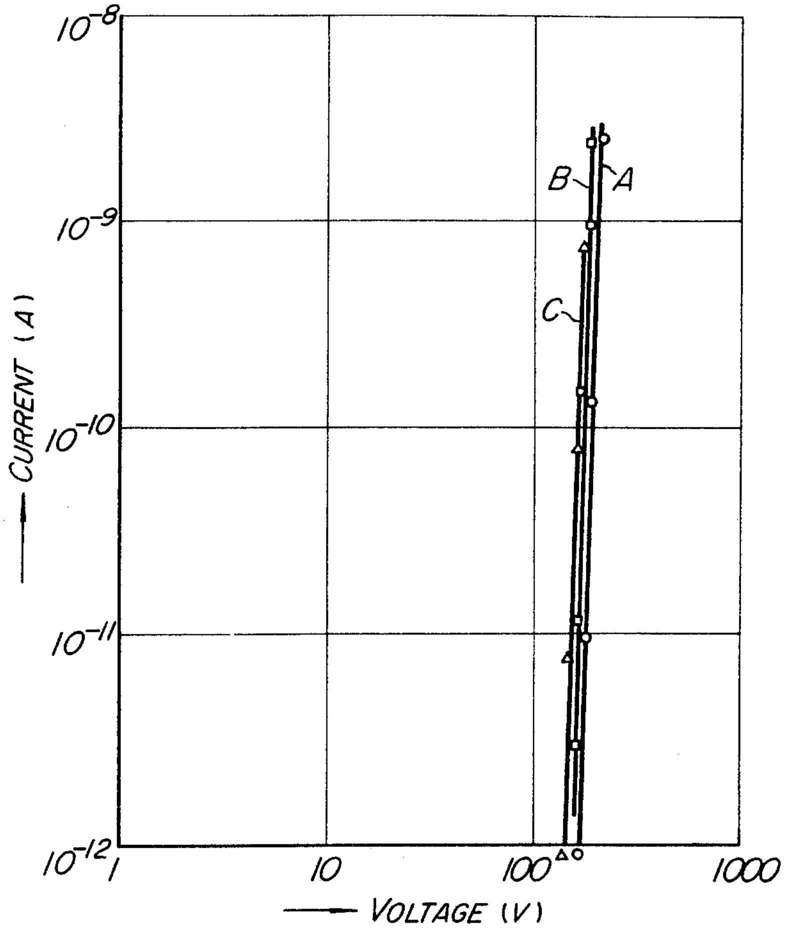
FIG. 9 shows dielectric characteristics when an alumina film is deposited at 800° C. and then heat-treated at 900° C.

In FIGS. 8 and 9, experimental results showing changes of incipient characteristics of a metallic oxide film, when deposited according to the present invention, are given. That is, in FIG. 8, changes of the dielectric characteristics of the $Al_2O_3$ films, when deposited while heating the substrate at a high temperature, are shown, where A is for the substrate temperature of 600° C.; B for 700° C.; C for 800° C.; D for 1,000° C.

In FIG. 9, no deterioration of the dielectric characteristic is shown when the film deposited at 800° C. is further heat-treated at a high temperature. Curve A is for the non-heat treated film (incipient value); Curve B for the heat-treated film at 900° C.; curve C for the heat-treated film at 1,000° C.

As is clear from the experimental results of FIGS. 8 and 9, the dielectric characteristic does not undergo any change and is very stable.

In the present invention, it is proposed, in view of these various examples, to heat the substrate to a temperature of 500° C. or higher when a metallic oxide film is deposited on the substrate by a glow discharge.

The present invention is not limited to these examples, but can be changed in various degrees within the scope and the spirit of the present invention.

What is claimed is:

1. A method of manufacturing a metallic oxide film on a substrate comprising the steps of:

a. preparing a mixture gas of oxygen and metallic halide gas in an evacuated chamber, with controlled pressures and in the presence of a substrate whose surface is to be covered with said metallic oxide film; and b. applying a high a. c. electric field of a frequency higher than 1 KHz to said chamber to produce a glow discharge adjacent to said surface of said substrate in said chamber while maintaining said substrate at a predetermined temperature of from about 100° C. to less than the melting point of the substrate, thereby causing the required chemical reaction for the formation of said metallic oxide film thereon.

2. A method for manufacturing a metallic oxide film on a substrate comprising the steps of:

a. preparing a mixture gas of oxygen and metallic halide gas in an evacuated chamber, with a desired controlled pressure and in the presence of a substrate whose surface is to be covered by said metallic oxide film;

b. applying a high a. c. electrical field of a frequency higher than 1 KHz to said chamber in a predetermined period to produce a glow discharge of said mixture gas adjacent to said substrate with said substrate at a temperature below the melting point thereof, thereby causing the required chemical reaction for the formation of said metallic oxide film thereon; and c. after the formation of the metallic oxide film thereon, heating the substrate to a desired temperature lower than the crystalizing temperature of said metallic oxide to stabilize an electrical property of the deposited metallic oxide film.

3. A method according to claim 1, wherein in the step of applying the high a.c. electric field to said chamber, said substrate is heated at a desired temperature higher than 500° C.

4. A method of manufacturing a metallic oxide film on a substrate comprising the steps of:

a. preparing a mixture gas of oxygen and metallic halide gas in an evacuated chamber, with a desired controlled pressure and in the presence of a substrate whose surface is to be covered by said metallic oxide film;

b. heating the substrate at first to a temperature higher than 500° C. but lower than its melting point;

c. applying a high a. c. electrical field of a frequency higher than 1 KHz to said chamber in a predetermined period to produce a glow discharge of said mixture gas adjacent to said substrate heated at said first temperature, thereby causing the required chemical reaction for formation of said metallic oxide film thereon; and d. after the formation of the metallic oxide film thereon, heating the substrate to a second temperature higher than said first temperature to stabilize an electrical property of the deposited metallic oxide film.

5. A method according to claim 1, wherein said glow discharge is carried out in a mixture gas of oxygen, nitrogen and metallic halide gas.

6. A method of manufacturing a metallic oxide film on a substrate comprising the steps of:

a. preparing a mixture gas of oxygen at 0.7 to 5 Torr and metallic halide gas at 0.05 to 2 Torr in an evacuated chamber, in the presence of a substrate whose surface is to be covered by said metallic oxide film; and b. applying a high a. c. electrical field of a frequency higher than 1 KHz to said chamber in a predetermined period to produce a glow discharge adjacent to said substrate while maintaining said substrate at a temperature of from about 100° C. to a temperature less than its melting point, thereby causing the required chemical reaction for formation of said metallic oxide film thereon.

7. A method for manufacturing an aluminum oxide film on a substrate comprising the steps of:

a. preparing a mixture gas of oxygen and aluminum halide in an evacuated chamber, with a desired controlled pressure and in the presence of a substrate therein;

b. applying a high a. c. electrical field of a frequency higher than 1 KHz to said chamber to produce a glow discharge adjacent to said substrate with said substrate maintained at a predetermined temperature less than its melting point, thereby causing the required chemical reaction for the formation of said aluminum oxide film thereon; and c. after the formation of the aluminum oxide film thereon, heating the substrate to a desired temperature lower than 800° C. to stabilize an electrical property of the deposited aluminum oxide film thereon.

8. A method according to claim 7, wherein in the step of applying the a.c. electrical field of high frequency to said chamber, said substrate placed on therein is heated to a temperature higher than 500° C.

9. A method for manufacturing an aluminum oxide on a semiconductor substrate comprising the steps of:

a. preparing a mixture gas of oxygen at 0.7 to 5 Torr and aluminum halide at 0.05 to 2 Torr within an evacuated chamber, in the presence of a substrate whose surface is to be covered by said metallic oxide film;

b. heating said semiconductor substrate at a temperature higher than 500° C.; and c. applying a high a. c. electrical field of a frequency higher than 1 KHz to said chamber over a predetermined period to produce a glow discharge adjacent to said substrate with the substrate at a predetermined temperature less than the melting point of the substrate, thereby causing the required chemical reaction for the formation of said aluminum oxide film thereon.

10. A method according to claim 1, wherein said predetermined temperature is within a range of about 100° C. to about 1,000° C.

11. A method according to claim 2, wherein said substrate is maintained at a temperature below 1,000° C. during step (b).

12. A method according to claim 4, wherein the substrate is heated during step (b) to a temperature higher than 500° C. but lower than 1,000° C.

13. A method according to claim 6, wherein said substrate is maintained during step (b) at a temperature below 1,000° C.

14. A method according to claim 7, wherein said predetermined temperature is between about 100° C. and about 1,000° C.

15. A method according to claim 9, wherein said substrate is heated to a temperature between about 100° C. and 1,000° C. during step (c).

* * * * *